US011192498B2

(12) United States Patent
Winberg et al.

(10) Patent No.: US 11,192,498 B2
(45) Date of Patent: Dec. 7, 2021

(54) APPARATUS FOR DETECTING HAZARDOUS OBJECTS WITHIN A DESIGNATED DISTANCE FROM A SURFACE

(71) Applicant: Moran Sachko, Netanya (IL)

(72) Inventors: Miky Winberg, Rishon Lezion (IL); Moran Sachko, Netanya (IL)

(*) Notice: Subject to any disclaimer, the term of this patent is extended or adjusted under 35 U.S.C. 154(b) by 168 days.

(21) Appl. No.: 16/309,468

(22) PCT Filed: Dec. 13, 2016

(86) PCT No.: PCT/IL2016/051332
§ 371 (c)(1),
(2) Date: Dec. 13, 2018

(87) PCT Pub. No.: WO2017/221228
PCT Pub. Date: Dec. 28, 2017

(65) Prior Publication Data
US 2020/0307454 A1    Oct. 1, 2020

(30) Foreign Application Priority Data

Jun. 22, 2016  (IL) .......................................... 246386

(51) Int. Cl.
*G08G 1/00* (2006.01)
*B60Q 9/00* (2006.01)
(Continued)

(52) U.S. Cl.
CPC .............. *B60Q 9/008* (2013.01); *B60R 11/00* (2013.01); *G01S 7/4813* (2013.01);
(Continued)

(58) Field of Classification Search
CPC ....... B60Q 9/008; G01S 17/931; G01S 17/04; G01S 7/4813; G01S 7/4817; B60R 11/00; B60R 2011/0084
See application file for complete search history.

(56) References Cited

U.S. PATENT DOCUMENTS 3,697,986 A * 10/1972 Colby ................... G01S 13/937
342/41
4,420,238 A    12/1983 Felix
(Continued)

FOREIGN PATENT DOCUMENTS

CN   200820108399      3/2009
CN   201320701411      4/2014
(Continued)

OTHER PUBLICATIONS

Morris et al., Unsupervised Learning of Motion Patterns, 2009.*
(Continued)

*Primary Examiner* — Quang Pham
(74) *Attorney, Agent, or Firm* — Soroker Agmon Nordman

(57) ABSTRACT

The subject matter discloses an object detection apparatus, comprising an external housing connectable to a surface, said external housing comprising sensors configured to scan a predetermined scanning space to detect an object located within said scanning space; a sensor extraction mechanism, which exposes the sensors to an environment surrounding the external housing to enable scanning of said environment by the sensors; a detection processor configured to receive a command to activate the sensors to scan the predetermined scanning space; activate the sensor extraction mechanism to expose the sensors for performing the scan; activate the sensors to scan the predetermined scanning space; receive scan data from the sensors; analyze the scan data to determine a hazardous object has been detected; generate a notification that a hazardous object was detected within the scanned area.

17 Claims, 9 Drawing Sheets

(51) Int. Cl.
*G01S 17/931* (2020.01)
*G01S 17/04* (2020.01)
*B60R 11/00* (2006.01)
*G01S 7/481* (2006.01)

(52) U.S. Cl.
CPC ............ *G01S 7/4817* (2013.01); *G01S 17/04* (2020.01); *G01S 17/931* (2020.01); *B60R 2011/0084* (2013.01)

(56) References Cited

U.S. PATENT DOCUMENTS

| | | | | |
|---|---|---|---|---|
| 4,562,439 | A * | 12/1985 | Peralta | G01S 13/89 342/179 |
| 5,475,494 | A * | 12/1995 | Nishida | G06K 9/00805 356/4.01 |
| 5,619,193 | A * | 4/1997 | Doherty | B60R 16/0237 340/580 |
| 6,650,402 | B2 * | 11/2003 | Sullivan | G01S 17/95 356/4.01 |
| 7,132,976 | B2 * | 11/2006 | Shinoda | G01S 7/2925 342/70 |
| 7,248,342 | B1 * | 7/2007 | Degnan | G01C 3/08 342/120 |
| 7,474,205 | B2 | 1/2009 | Trela | |
| 7,697,126 | B2 * | 4/2010 | Farsaie | G01C 3/08 356/141.5 |
| 8,080,808 | B2 * | 12/2011 | Norris | G01V 5/0008 250/390.04 |
| 8,825,391 | B1 * | 9/2014 | Urmson | G05D 1/0274 701/448 |
| 8,909,375 | B2 * | 12/2014 | Larson | G01S 7/4817 700/259 |
| 9,043,072 | B1 * | 5/2015 | Tisdale | G05D 1/021 701/28 |
| 9,097,800 | B1 | 8/2015 | Zhu | |
| 9,129,495 | B1 | 9/2015 | Stewart et al. | |
| 9,845,046 | B1 * | 12/2017 | Arceo | B60Q 1/525 |
| 10,011,230 | B1 * | 7/2018 | Brown | H04N 5/2252 |
| 10,175,361 | B2 * | 1/2019 | Haines | G01S 7/4817 |
| 10,202,115 | B2 * | 2/2019 | Stenneth | B60W 40/04 |
| 10,455,187 | B2 * | 10/2019 | Callis, Jr. | H04N 5/23238 |
| 10,502,574 | B2 * | 12/2019 | Robinson | G01C 21/18 |
| 10,775,488 | B2 * | 9/2020 | Bradley | G01S 7/4815 |
| 10,782,405 | B2 * | 9/2020 | Kim | G01S 13/931 |
| 10,908,264 | B2 * | 2/2021 | O'Keeffe | G01S 7/4817 |
| 2002/0113415 | A1 | 8/2002 | Pochmuller | |
| 2004/0165750 | A1 | 8/2004 | Chew | |
| 2004/0199785 | A1 * | 10/2004 | Pederson | H04N 7/18 340/293 |
| 2006/0098843 | A1 * | 5/2006 | Chew | B61L 23/041 382/103 |
| 2006/0197867 | A1 * | 9/2006 | Johnson | F16M 11/18 348/373 |
| 2006/0259933 | A1 | 11/2006 | Fishel et al. | |
| 2007/0219720 | A1 * | 9/2007 | Trepagnier | G05D 1/0278 701/300 |
| 2008/0228400 | A1 * | 9/2008 | Wheeler | E01F 9/578 701/301 |
| 2009/0096634 | A1 * | 4/2009 | Emam | G08G 1/167 340/901 |
| 2009/0211605 | A1 * | 8/2009 | Ahmad | B60S 1/481 134/18 |
| 2010/0063736 | A1 * | 3/2010 | Hoetzer | G08G 1/166 701/301 |
| 2010/0064963 | A1 | 3/2010 | Dukes | |
| 2010/0157056 | A1 | 6/2010 | Zohar et al. | |
| 2010/0182398 | A1 | 7/2010 | Mazzilli | |
| 2012/0056734 | A1 * | 3/2012 | Ikeda | G08G 1/165 340/425.5 |
| 2013/0093583 | A1 * | 4/2013 | Shapiro | G01S 15/931 340/436 |
| 2013/0128048 | A1 * | 5/2013 | Okajima | B60R 1/00 348/148 |
| 2013/0141572 | A1 * | 6/2013 | Torres | H04N 7/185 348/143 |
| 2013/0242103 | A1 * | 9/2013 | Schraga | B60W 10/18 348/148 |
| 2013/0265151 | A1 * | 10/2013 | Braeuchle | G08B 13/19647 340/435 |
| 2013/0343071 | A1 * | 12/2013 | Nagaoka | B60Q 9/008 362/466 |
| 2013/0343613 | A1 * | 12/2013 | Heger | G06K 9/00791 382/106 |
| 2014/0061305 | A1 * | 3/2014 | Nahill | G06K 7/1096 235/438 |
| 2014/0229077 | A1 | 8/2014 | James et al. | |
| 2014/0270383 | A1 * | 9/2014 | Pederson | G08G 1/04 382/104 |
| 2014/0305732 | A1 * | 10/2014 | Tulett | G01V 1/0475 181/112 |
| 2014/0347440 | A1 * | 11/2014 | Hatcher | H04N 5/2259 348/36 |
| 2015/0076504 | A1 | 3/2015 | Pederson | |
| 2015/0169968 | A1 | 6/2015 | Michmerhuizen et al. | |
| 2015/0321605 | A1 | 11/2015 | Mirza et al. | |
| 2015/0353009 | A1 * | 12/2015 | Lettieri | B60Q 9/008 340/435 |
| 2016/0090132 | A1 | 3/2016 | Ramsey et al. | |
| 2016/0282468 | A1 * | 9/2016 | Gruver | G01S 7/4815 |
| 2018/0090007 | A1 * | 3/2018 | Takemori | G01S 17/931 |
| 2018/0114442 | A1 * | 4/2018 | Minemura | B60T 8/17558 |
| 2018/0326981 | A1 * | 11/2018 | Nakamura | B60W 10/20 |

FOREIGN PATENT DOCUMENTS

| | | | | |
|---|---|---|---|---|
| DE | 102006054639 | | 9/2009 | |
| EP | 1255235 | | 11/2002 | |
| EP | 2003471 | A1 | 6/2007 | |
| EP | 2003471 | A1 * | 12/2008 | ........... G01S 17/931 |
| WO | 0234583 | | 5/2002 | |
| WO | 2006/071198 | | 12/2005 | |
| WO | 2010664963 | | 6/2010 | |
| WO | WO-2010097251 | A * | 9/2010 | ............. B60T 11/16 |
| WO | 2014137242 | | 9/2014 | |
| WO | 2016008618 | | 1/2016 | |

OTHER PUBLICATIONS

Morris et al., Vehicle Iconic Surround Observer Visualization Platform for Intelligent Driver Support Applications, 2010.*
Abdulsada, Underneath Vehicle Inspection Using Fuzzy Logic Subsumption and OpenCV Library (Year: 2015).*
Tian et al., Robust detection of abandoned and removed objects in complex surveillance videos (Year: 2010).*
Wallin et al., Laser-based Stand of Detection of explosives a critical review (Year: 2009).*
Guidi et al., Fusion of range camera and photogrammetry A systematic procedure for improving 3-D models metric accuracy (Year: 2003).*
Kim et al., Versatile Low-Cost Volumetric 3D Ultrasound Imaging Using Gimbal-Assisted Distance Sensors and an Inertial Measurement Unit (Year: 2020).*
Schlarp et al., Feature detection and scan area selection for 3D laser scanning sensors (Year: 2018).*
Sun et al., Sensor for In-Motion Continuous 3D Shape Measurement Based on Dual Line-Scan Cameras (Year: 2016).*
Torre et al., Optical Shape Sensor Using Electronically Controlled Lens (Year: 2016).*
"Securitex VUC Scanner" http://www.securitex.com.sg/Undercarriage%20scanner.htm.
"Stratech IVACS (Intelligent Vehicle Access Control System)" http://www.thestratechgroup.com/iv_jvacs.asp.
Vehicle Bomb Detector, Vindicator Technologies—TALOS.

* cited by examiner

APPARATUS FOR DETECTING HAZARDOUS OBJECTS WITHIN A DESIGNATED DISTANCE FROM A SURFACE

FIELD OF THE INVENTION

The present disclosure generally relates to an object apparatus for detecting hazardous objects within a designated distance from a surface.

BACKGROUND

Systems and apparatuses for detecting hazardous objects in a vehicle require extensive modifications to the vehicle. Drilling and changes to the vehicle frame and undercarriage are required for placing sensors, wiring, connections to the vehicle processor and power system, e.g. the battery. Such modifications are expensive and require customization of the vehicle by professional mechanics. The location of the sensors, specifically in the undercarriage, increases the likelihood that the sensors are exposed to fluids and debris, e.g. water, mud. Likewise, the sensors are exposed to objects that can damage or destroy the sensors, such as rocks, pebbles, etc. Such environmental factors can cause the system to be ineffective when the sensors are soiled or damaged, thus requiring continuous maintenance and/or repair.

In some cases, the security is required for a facility, or a location and not for a particular vehicle. In such cases, the system for detecting hazardous objects is attached to a surface, e.g. a checkpoint on a road, where the system scans the undercarriage of a vehicle driving over scanners installed on the road surface. Such systems are bulky and difficult to move from a location where the system is installed.

Likewise, installing such systems for detection of hazardous objects designed for security of edifices, requires modification to the edifice's wall, such as drilling, running wires through the walls, installing sensors in set locations. Similar to the vehicle system, the edifice system for detection of hazardous objects requires expensive alteration of the edifice or constructing the edifice with the system embedded therein.

SUMMARY

It is an object of the subject matter to disclose an object detection apparatus, comprising an external housing connectable to a surface, said external housing comprising: one or more sensors configured to scan a predetermined scanning space to detect an object located within said predetermined scanning space; a sensor extraction mechanism, which exposes the one or more sensors to an environment surrounding the external housing to enable scanning of said environment by the one or more sensors; a detection processor configured to: receive a command to activate the one or more sensors to scan the predetermined scanning space; activate the sensor extraction mechanism to expose the one or more sensors for performing the scan; activate the one or more sensors to scan the predetermined scanning space; receive scan data from the one or more sensors; analyze the scan data to determine a hazardous object has been detected; generate a notification that a hazardous object was detected within the scanned area.

In some cases, the detection apparatus is connected to a vehicle processor and a vehicle power source.

In some cases, the object detection apparatus further comprises a connection means to connect the detection apparatus to the surface.

In some cases, the object detection apparatus further comprises a transceiver for transmitting the notification to user computerized device to notify a user of the detection of the object.

In some cases, the detection processor is further configured to: activate the sensor extraction mechanism to retract the one or more sensors upon receiving an end scan indication; deactivate the one or more sensors.

In some cases, the notification is transmitted to a user computerized device as a text message, a video message, an image message, and a combination thereof.

In some cases, the notification provides activating a light in a vehicle to notify that the hazardous object is detected.

In some cases, the detection processor is further configured to receive a scan indication to initiate the scanning of the predetermined scanning area.

In some cases, the sensor extraction mechanism comprises an elevation mechanism, which moves the sensor platform along the predetermined axis to enable the one or more sensors to detect objects located within a designated distance from the surface.

In some cases, the object detection apparatus further comprises an external cover, to seal the external housing when the object detection apparatus is not performing.

In some cases, the detection processor is further configured to activate a camera to provide an image or video of the hazardous object.

It is another object of the subject matter to disclose object detection apparatus, comprising: an external housing connectable to a surface, said external housing comprising: one or more sensors configured to scan a predetermined scanning space to detect an object located within said predetermined scanning space; a sensor platform supporting the one or more sensors; an elevation mechanism, which moves the sensor platform along the predetermined axis to enable the one or more sensors to detect objects located within the scanning space; a detection processor configured to: receive a command to activate the one or more sensors to scan the predetermined scanning space; activate the elevation mechanism to expose the one or more sensors for performing the scan; activate the one or more sensors to scan the predetermined scanning space; receive scan data from the one or more sensors; analyze the scan data to determine a hazardous object has been detected; generate a notification that a hazardous object was detected within the scanned area an external cover, to seal the external housing and the enclosed sensors when the sensors are inactivate.

In some cases, the detection apparatus is connected to a vehicle processor and a vehicle power source.

In some cases, the object detection apparatus further comprises a connection means to connect the detection apparatus to the surface.

In some cases, the object detection apparatus further comprises a transceiver for transmitting the notification to user computerized device to notify a user of the detection of the object.

In some cases, the notification is transmitted to a user computerized device as a text message, a video message, an image message, and a combination thereof.

In some cases, the detection processor is further configured to: activate the elevation mechanism to lower the sensor platform upon receiving an end scan indication; deactivate the one or more sensors.

In some cases, the detection processor is further configured to receive a scan indication to initiate the scanning of the predetermined scanning area.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described.

Figure 1:
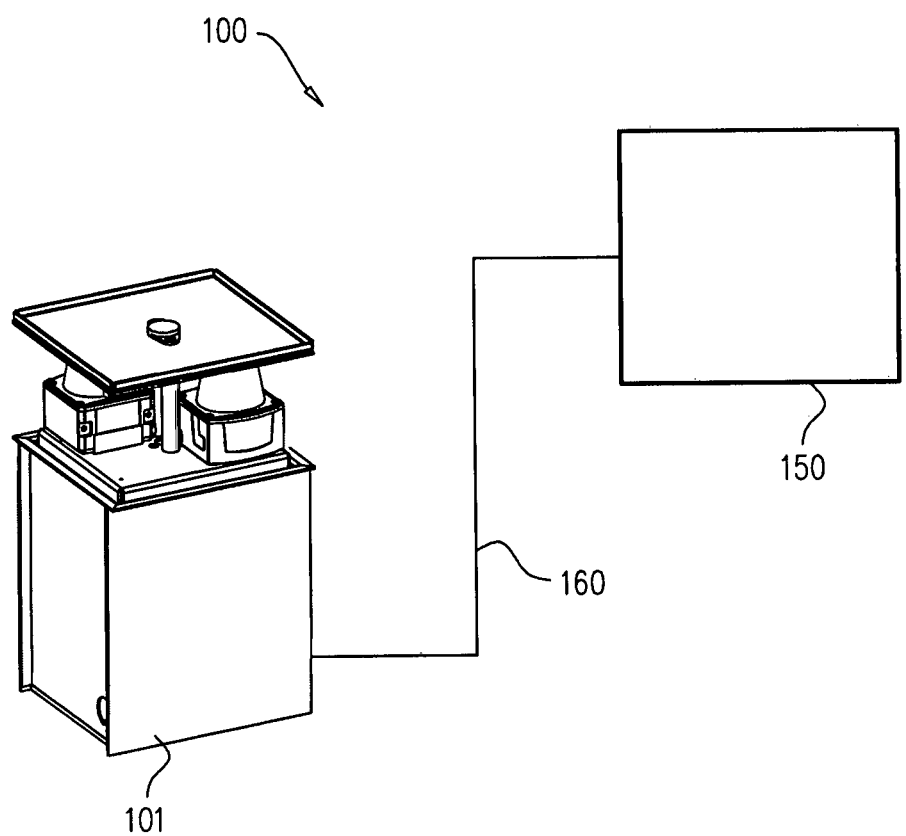

Dimensions of components and features shown in the figures are chosen for convenience or clarity of presentation and are not necessarily shown to scale or true perspective. For convenience or clarity, some elements or structures are not shown or shown only partially and/or with different perspective or from different point of views. References to previously presented elements are implied without necessarily further citing the drawing or description in which they appear.

Figure 2:
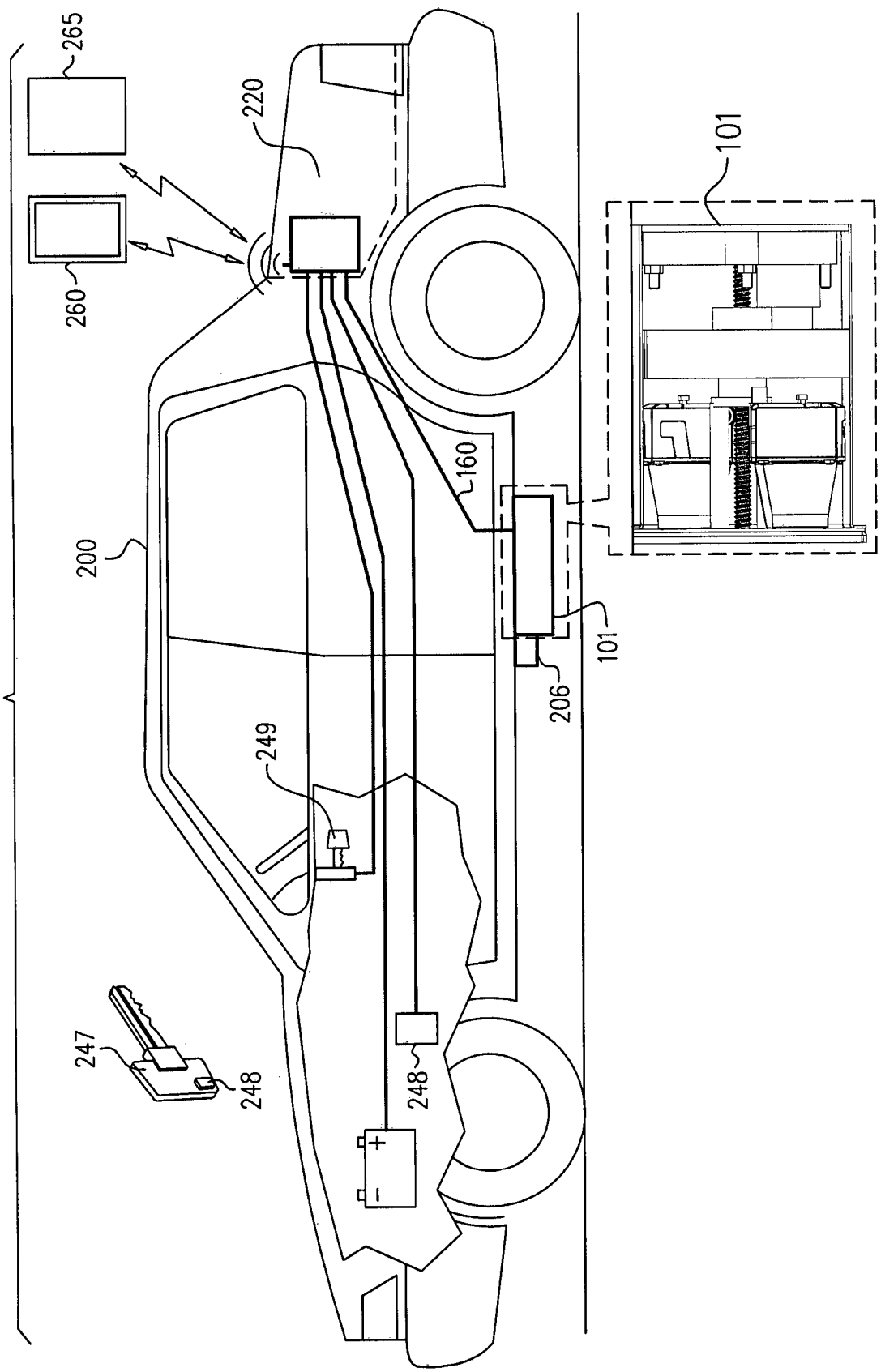
Figure 4:
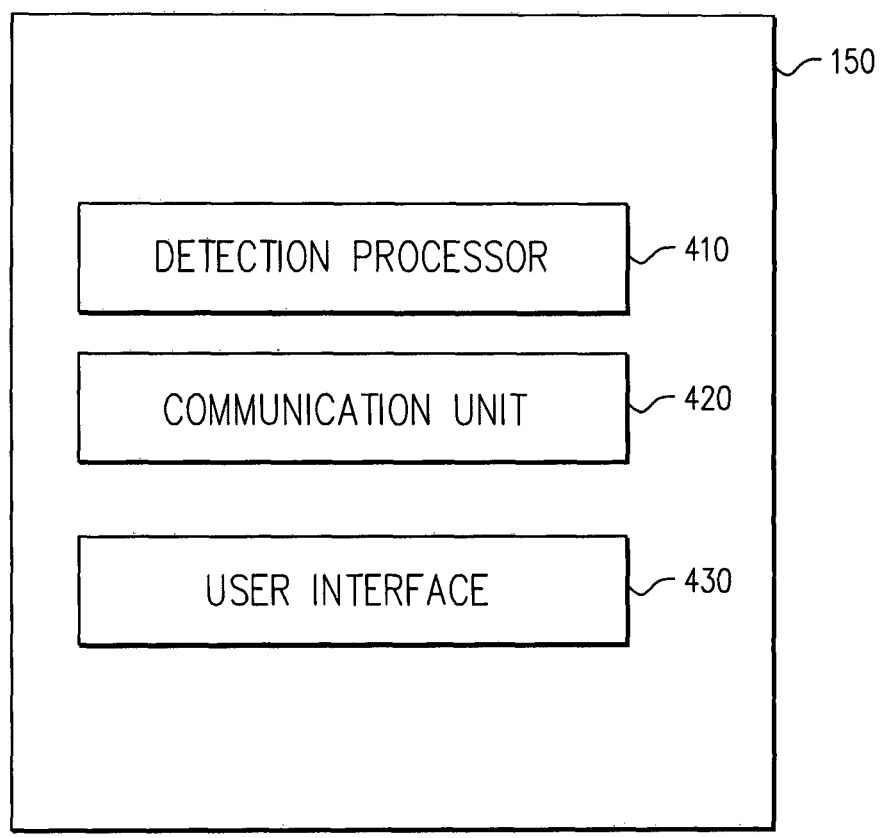
Figure 5:
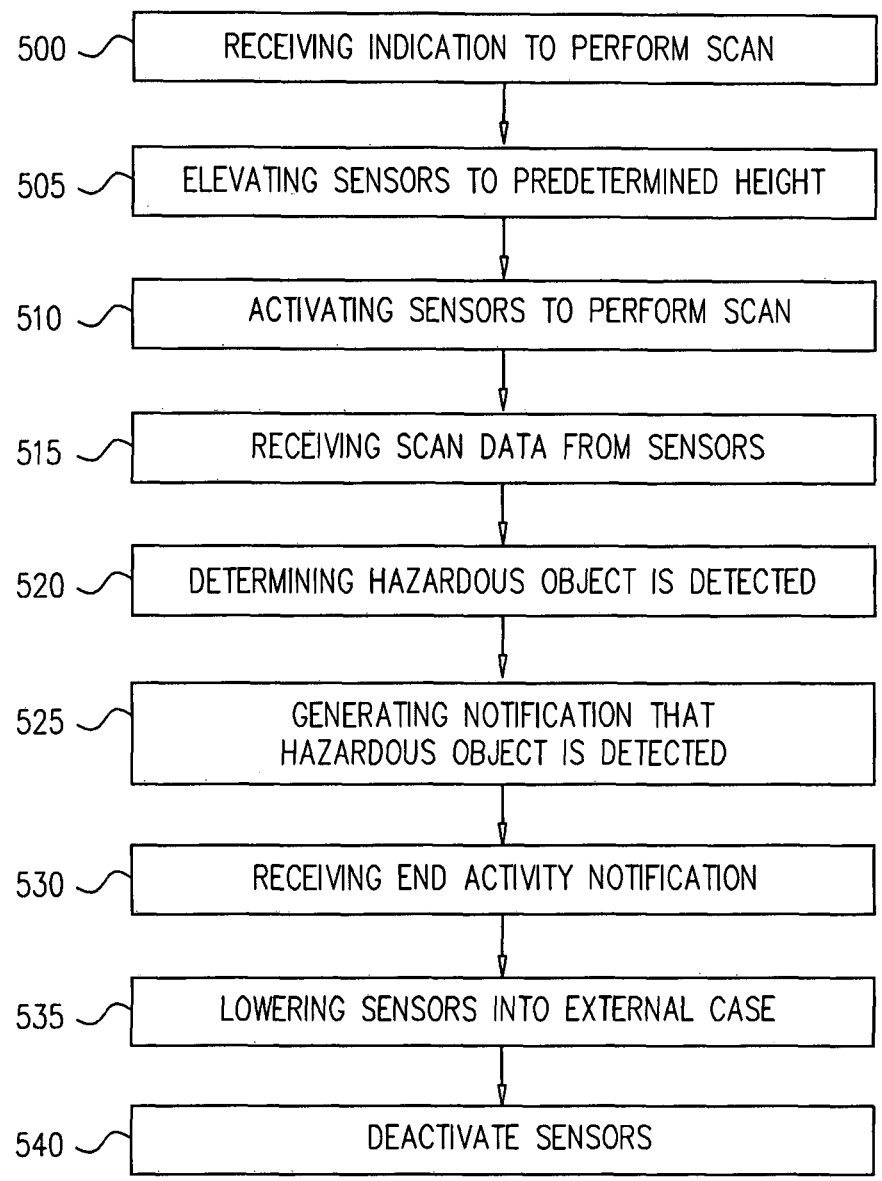

FIG. 1 schematically illustrates an object detection unit, according to some exemplary embodiments of the disclosed subject matter;

FIG. 2 schematically illustrates an object detection apparatus connected to a vehicle, according to some exemplary embodiments of the subject matter;

FIGS. 3A-3E schematically illustrate a detection unit of an object detection unit, according to some exemplary embodiments of the subject matter;

FIG. 4 schematically illustrates a control unit of a detection apparatus, according to some exemplary embodiments of the subject matter; and, FIG. 5 schematically shows a method performed by an object detection apparatus, according to some exemplary embodiments of the subject matter.

DETAILED DESCRIPTION

One technical problem dealt by the disclosed subject matter is that detecting hazardous objects within a predetermined scanning area or space typically require modification or customization of a structure. For example, detection systems for detecting objects near or attached to a vehicle's undercarriage require drilling holes into the vehicle's undercarriage to enable attaching sensors of the system to detect objects. In another example, providing a detection system for a house is typically performed by installing detection sensors in the house by drilling and running wires through walls, as well as drilling through the walls to connect the sensors to a central controlling unit. The sensors are exposed and can be damaged or neutralized by environmental elements, such as dirt or water.

Another technical problem dealt with by the present subject matter is providing a notification when a hazardous object is detected.

One technical solution according to the disclosed subject matter is an object detection apparatus comprising scanners that are stored within a housing or casing, e.g. a secure or hardened casing. In one embodiment. The scanning sensors are secured within the casing when inactive, and are exposed from the casing when a scanning operation is required. In one embodiment, the scanning sensors retractably extendable or exposable from the hardened casing in order to scan for hazardous objects. When the scanning sensors complete a scanning operation, they are retracted or reinserted into the hardened case for safekeeping, e.g. to maintain the sensors secure and clean, and to refrain from damage to the sensors or from accumulation of dirt or debris until the next use.

The object detection apparatus is attachable to a surface. The object detection apparatus performs a scanning of a surface or a space, e.g. at predetermined times or according to received commands to detect whether hazardous objects are within a predetermined scanning area or space.

The scanning operation, when referred to herein, may include, for example, extending one or more sensors from a secure housing, and activating the one or more scanning sensors to capture and obtain scan data. The captured scan data may include: indication of an intrusion into a designated or predetermined space, a direction of motion of the intruding object, a size the of the intruding object, spatial coordinates of the detected object along a predetermined set of coordinates, time of detection, etc. The scanning operation may include activating, for example, a laser scanning ray or array, which may provide indication of the position of the detected object within the predetermined scanning space.

The scanning operation may be configured to be automatically activated, e.g. upon detecting that a vehicle has stopped, or by activating a vehicle alarm The object detection apparatus comprises a sensor extraction mechanism, which enables exposure of the sensors to an environment surrounding the object detection device during a scanning operation, and retraction of the sensors when scanning operation is completed. In some embodiments, the sensor extraction mechanism is an elevation mechanism that elevates the sensors in and out of a housing or casing of the object detection apparatus. In another embodiment, the sensors may be immobile or fixed to an immobile platform, and the extraction mechanism comprises openable casing walls of the external housing, which may be openable or retractable or otherwise movable in order to expose the sensors thus enabling to perform a scan of a designated area or space. In yet another embodiment, the scanning sensors may be exposed from the secure housing 310 during a scanning operation, e.g. by extending the scanning sensors outward from the object detection device, for example along one or more axes that may be parallel to the ground and/or perpendicular to the ground.

Another technical solution of the subject matter provides a system for enabling communication between the object detection apparatus and a user device, to enable providing a notification that a hazardous object has been detected within the predetermined scanning space.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

FIG. 1 schematically illustrates an object detection unit, according to some exemplary embodiments of the disclosed subject matter. The object detection unit 100 comprises a detection unit 101, which detects hazardous objects within a designated or a predetermined scanning space or area near the detection unit 101. The object detection apparatus 100 comprises a control unit 150, which is configured to control the operation of the detection unit 101. The control unit 150 is configured to provide notifications upon detection of a hazardous object by the detection unit 101. The control unit 150 and detection unit 101 are coupled together via a coupling means, for example, wiring 160. It should be noted that the control unit 150 may be operationally coupled to or connected to one or more detection units 101, represented here by the detection unit 101, thus controlling scanning operations for hazardous objects at different locations or placements of a space that is designated for detection, by controlling each detection unit of the one or more detection units. In some exemplary embodiments of the subject matter, the coupling means may be wireless connection such as Wi-Fi, radio frequency (RF), cellular communication, wireless LAN, Bluetooth, etc., enabling the control unit 150 to be located remotely from the detection unit 101, thus allowing configuration of the detection unit 101 as a compact device that is easily placed in small spaces. For example, the detection unit 101 is connected to a bottom surface of a vehicle 200 near a rear axle 230 of the vehicle 200 as further disclosed in FIG. 2 herein. In one embodiment, the control unit 150 may be positioned inside the car or in the trunk.

FIG. 2 schematically illustrates a placement of an object detection apparatus connected to a vehicle, according to some exemplary embodiments of the subject matter. The object detection unit 101 is installed onto the vehicle 200 such that the detection unit 101 is connected to the vehicle 200 at a location that allows scanning for hazardous objects. For example, the detection unit 101 is connected to an undercarriage 210 of the vehicle 200 near a rear axle 230. The detection unit 101 is configured to be compact and to be connected to the vehicle 200 in such a manner so that when the detection unit 101 is not performing a scanning operation of the designated space, the scanning sensors are stored and protected from environmental elements and tampering within a secure or hardened housing, e.g. a housing 310 of the detection unit 101, as disclosed in FIG. 3 herein. The control unit 150 is placed in a safe or convenient location within vehicle 200, for example, a trunk 220 of the vehicle 200, which prevents environmental damage or unwanted tampering with the control unit 150. In some cases, the object detection unit 100 may be connected to a car power supply, for example, a car battery 240, which is used to power the object detection apparatus 100.

The object detection apparatus 100 receives a scan indication to perform a scanning for hazardous objects within a designated scanning space or a predetermined scanning area or space, for example, from a vehicle processor 245, e.g. automatically when the vehicle ignition is activated. For example, the vehicle processor 245 recognizes that a key 247 of the vehicle 200 is inserted into a vehicle ignition 249, or a start button on the key 247 is pressed to start the vehicle 200 remotely. The vehicle processor 245 transmits a scan indication to the object detection apparatus 100, e.g. the control unit 150, which performs a scanning operation to detect hazardous objects located within the designated scanning space. For example, the designated scanning space may include a space beneath the car, e.g. of a 4 or 5 meter radius.

The object detection apparatus 100 may communicate with a user computerized device 260 and/or an emergency server 265. The user computerized device 260 is a computer device used by a user, e.g. a driver of the vehicle 200, to receive notifications from the object detection apparatus 100. The user computerized device 260 may include a mobile phone, tablet, smart watch, etc.

The emergency server 265 may be located in or connected to a law enforcement dispatch center, to notify law enforcement of the hazardous object detected by the object detection apparatus. The object detection apparatus 100 may transmit notifications to the user computerized device 260 and/or to the emergency server 265 when a hazardous object is detected by the object detection apparatus 100. The notifications may be displayed for example, as SMS messages or alerts on a display unit of the user computerized device 260.

In some exemplary non-limiting cases, the scan indication may be received from the user computerized device 260 via a user interface provided on the user computerized device 260, or via a software application installed on the user computerized device 260 for controlling and monitoring the activities of the object detection apparatus 100. For example, if the driver wants to initiate a random scanning operation, the driver inputs a command to the user computerized device 260 via the application or the user interface, which transmits a scan indication to the object detection apparatus 100, e.g. the control unit 150.

In some exemplary embodiments of the subject matter, the user computerized device 260 may configure or customize the scanning parameters of the sensors 315. For example, the configurable parameters may comprise: designating a predetermined scanning space or area, designating a shape of the scanning space, determining a size range or a size threshold of objects for which a notification is generated that a hazardous object is detected, configuring the amount of time the object has to be scanned by the sensors 315 in order to be determined as hazardous, configuring a range of the rate or direction of motion required to generate an indication of a detected object within the scanning space, or the like.

In some non-limiting case, the object detection apparatus 100, e.g. the control unit 150, may receive a command to activate a camera 206 to view images or real-time video of the predetermined scanning area/space in which the hazardous object has been detected. For example, the object detection apparatus 100 has detected a hazardous object within the predetermined scanning area, the object detection apparatus 100 transmits a notification to the user computerized device 260 that a hazardous object was detected. The user interface of user computerized device 260 may automatically generate a command to activate an image sensor or camera 206 to provide visual images of the predetermined scanned area. The visual images are then transmitted by the object detection apparatus 100 to the user computerized device 260 to be displayed and show the object detected by the object detection unit 100. Additionally or alternatively, the visual images may indicate (e.g. mark or highlight) the detected object.

Figure 3A:
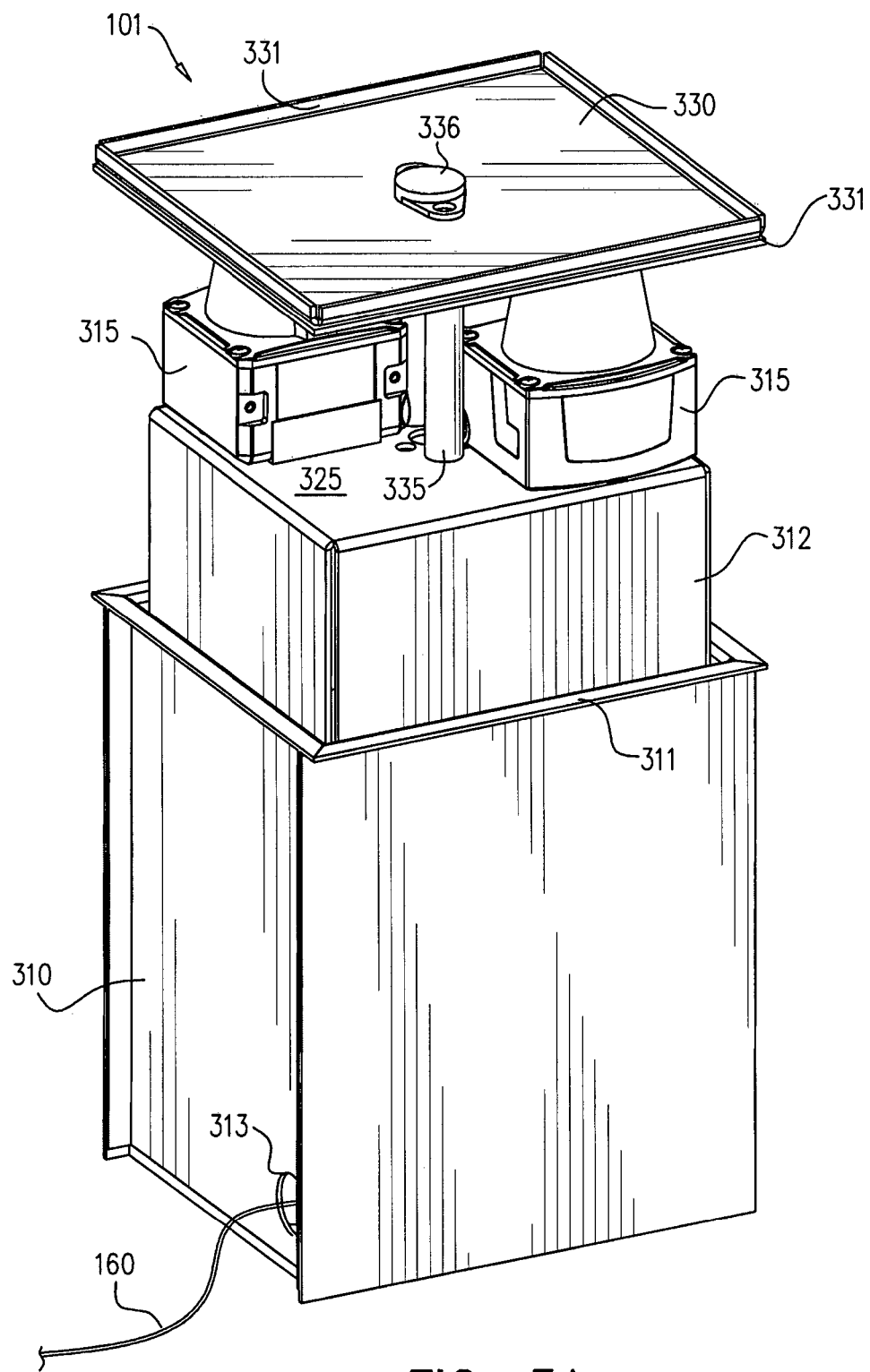

FIG. 3A-3E schematically illustrate a detection unit of an object detection unit, according to some exemplary embodiments of the subject matter. FIG. 3A schematically illustrates a detection unit 101 of the object detection unit 100, according to some exemplary embodiments of the subject matter. The detection unit 101 comprises a housing 310, which houses and protects the other components detection unit 101. The detection unit 101 comprises a sensors cover plate 330, which protects the sensors 315 when the sensors 315 are stored within the housing 310. The cover plate 330 connects to the sensor platform 325 by one or more platform rods 335. The cover plate 330 comprises a rod nut 336, which attaches the one or more platform rods 335 to the cover plate 330.

The detection unit 101 comprises one or more sensors 315, indicating any number of sensors, represented here by two sensors 315. The sensors 315 may be laser scanners, volume sensors, position detectors, for example, Sick® Sensors, temperature sensors, and/or any other sensor enabling detection of hazardous objects. Each sensor 315 scans in a predetermined or designated range along a two-dimensional or three-dimensional area, e.g. scanning along an X-Y plane or within an X-Y-Z space. The scanning area or scanning space of the sensors 315 may be programmable to customize parameters of the scanning. For example, the customizable parameters may be the radius of the scanned perimeter, the shape of the scanned parameter, the planes in which the scanning occurs, or the like. In one example, the sensor 315 has a scanning angle of one-hundred eighty degrees.

When the sensor 315 detects an object within the scanning range, the sensor 315 generates scan data that may include a determination whether an object is or is not detected within the scanning range. For example, the scanner 315 may generate scan data comprising a binary indication value of one ('1') when the scanner 315 detects a hazardous object, and the scanner 315 generates a binary indication value of zero ('0') when the scanner 315 does not detect an object. Other detection indications may include, for example, distance of the hazardous object from the sensors 315, size of the hazardous object detected, a duration of time the hazardous object is within the scanning perimeter, the position or coordinates of the hazardous object within the scanned space, or the like.

The scanner 315 provides the detection indication to a processing unit, such as a processor 405 of FIG. 4.

The one or more sensors 315 are connected to a sensor platform 325. The sensor platform 325 connects to the elevating mechanism 360 of FIGS. 3B and 3D, which extends and retracts (e.g. raises and lowers) the sensor platform 325 in and out of the housing 310. The sensor platform 325 is connected to a sensor base 312.

Figure 3B:
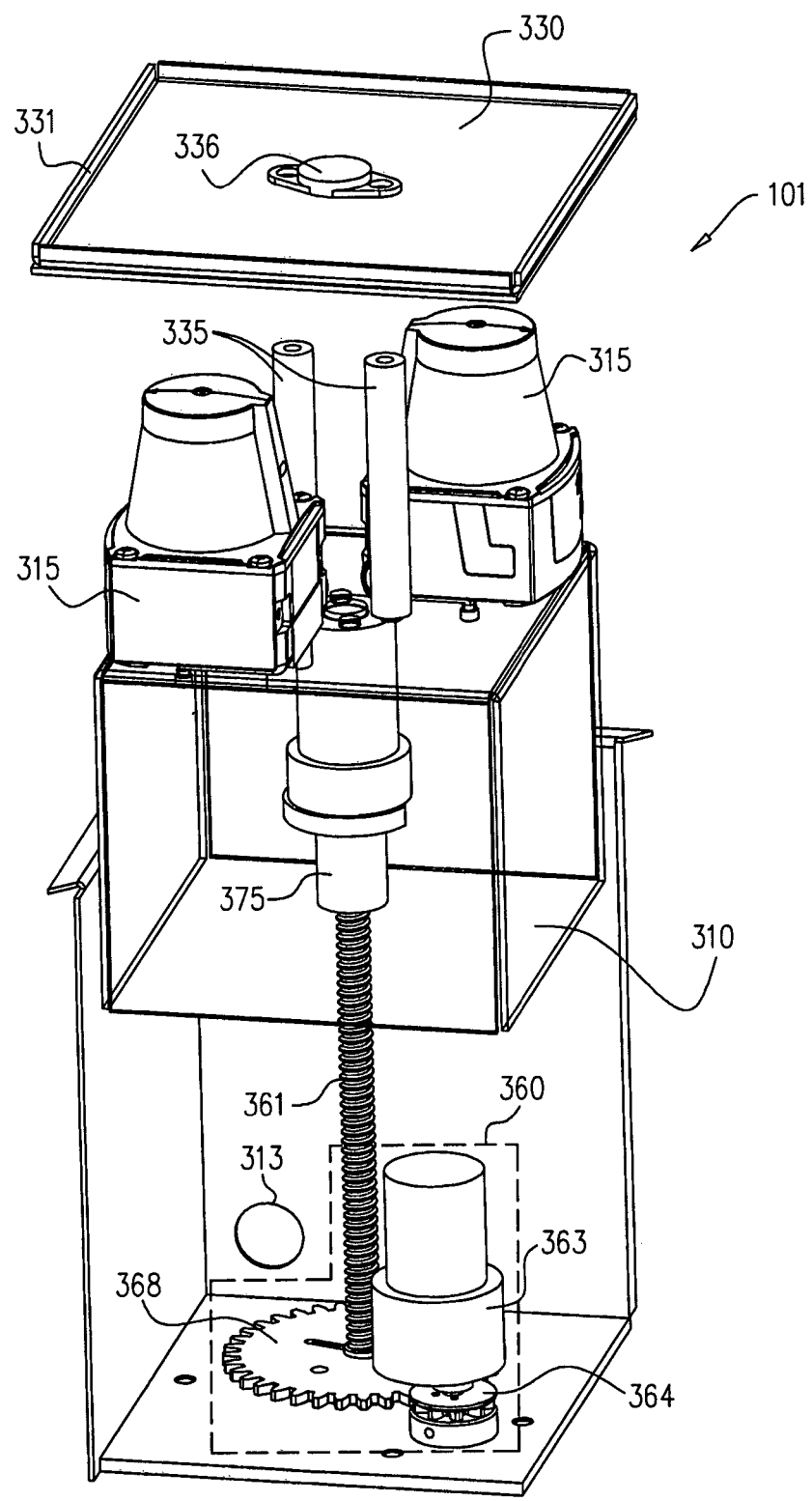

FIG. 3B schematically illustrates a see-through view of a detection unit 101, according to some exemplary embodiments of the subject matter. The detection unit 101 comprises the sensor extraction mechanism, which exposes the sensors 315 to the environment surrounding the object detection (e.g. by extending the sensors from the secure housing 310, or by opening or moving one or more covering portions of the secure housing 310 of unit 100 in order to expose the sensors 315, such that the sensors 315 can perform a scanning for hazardous objects. In some non-limiting exemplary embodiments, sensor extraction mechanism may be the elevating mechanism 360. The elevating mechanism 360 comprises a motor 363, which controls the movement of a gear 368. The motor 363 is coupled to the control unit 150 via the wiring 160, to enable the control unit 150 to control the activity of the elevating mechanism 360. The motor 363 controls the motion of a driving gear 364, which moves the gear 368. As the gear 368 rotates, a driving screw 361 rotates to raise and lower the sensor platform 325. The driving screw 361 comprises a rotating base 375, which connects to the sensor platform 325. The rotating base 375 elevates and lowers the sensor platform 325 by rotating around the driving screw 368.

Figure 3C:
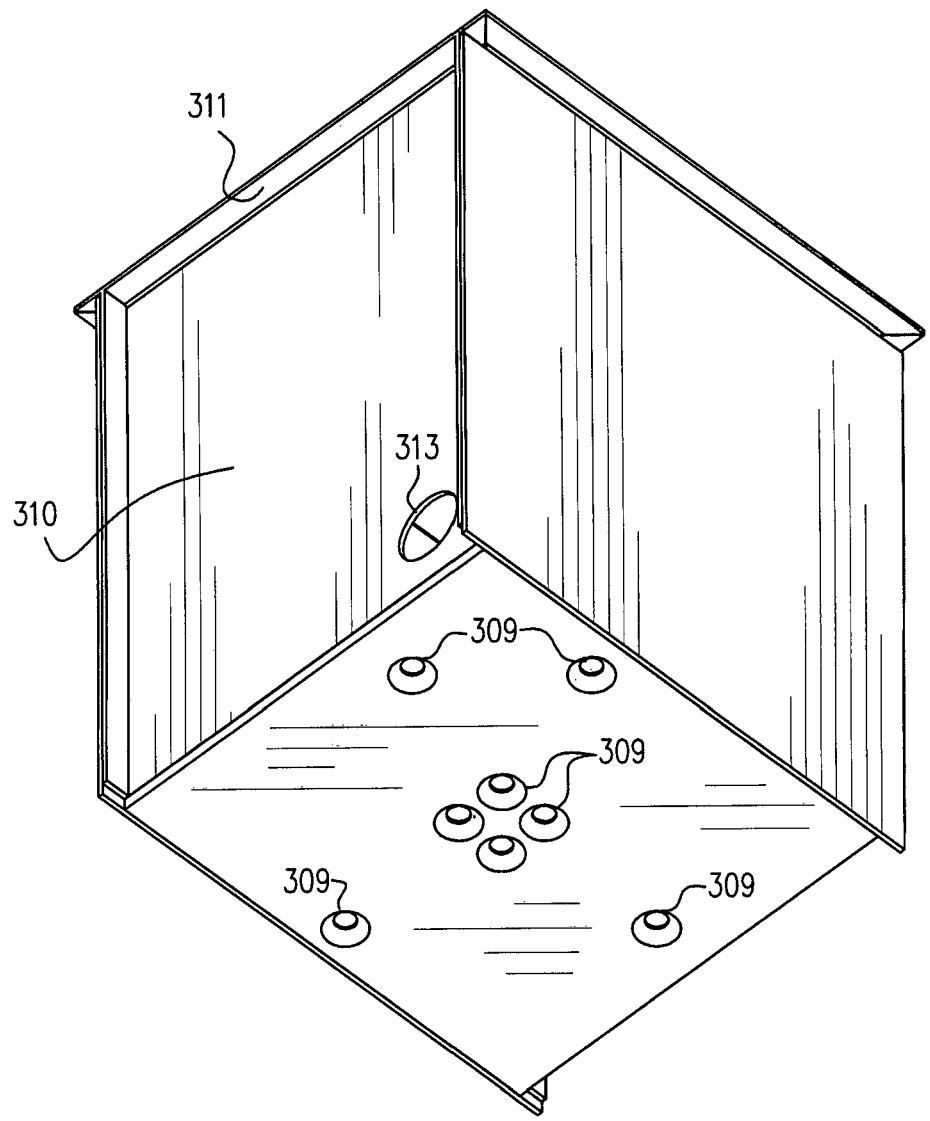

FIG. 3C schematically illustrates the housing 310 of the detection unit 101, according to some exemplary embodiments of the subject matter. The housing 310 is constructed to prevent damage and tampering with the components of the detection unit 101. The housing 310 comprises a sealant lining 311, which enables the housing 310 to be sealed when the detection unit 101 is not scanning. The sealant lining 311, may be a rubber lining, which seals the hardened casing when the cover plate 330 is lowered to seal the detection unit 101.

The housing 310 comprises attachment elements 309, for example, the attachment elements 309, representing any number of attachment elements 309. The housing 310 is constructed to be waterproof and durable to prevent damage to the components located within it. The attachment elements 309) may comprise openings for inserting bolts that allow attaching the detection unit 101 to a surface, for example, to the undercarriage 210 of FIG. 2. In some non-limiting cases, the attachment element 309 comprises other attachment means, e.g. adhesive connectors, magnetic connectors, suction elements which attach the detection unit 101 using suction and vacuum of the suction elements, etc.

The housing 310 comprises a wire opening 313, to enable the wiring 160 of FIG. 1 to connect the control unit 150 to internal components of the detection unit 101, e.g. the sensors 315 and the elevation mechanism 360.

Figure 3D:
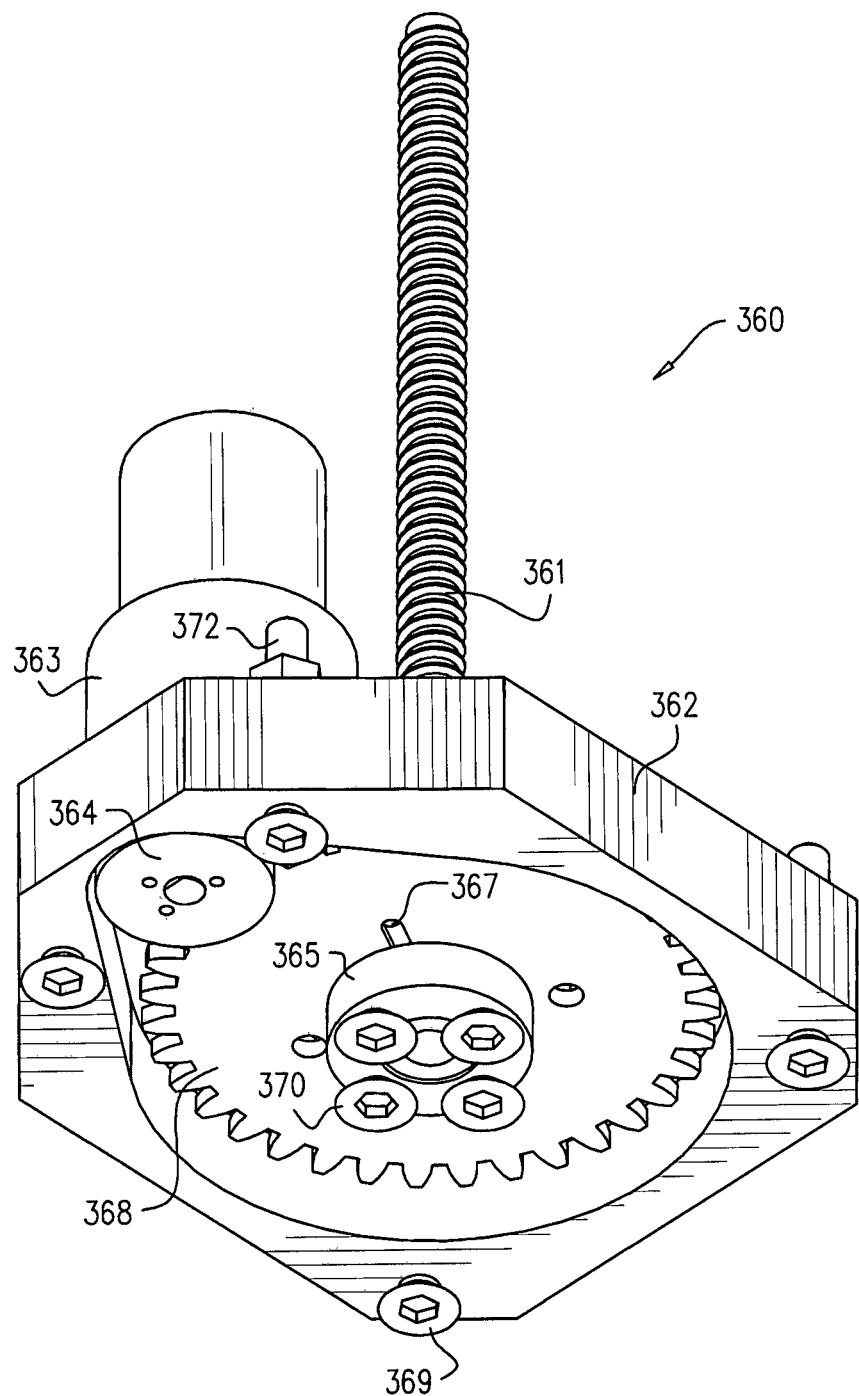

FIG. 3D schematically illustrates the elevating mechanism 360 of the detection unit 100, according to some exemplary embodiments of the subject matter. In some exemplary embodiments of the subject matter, the sensor extraction mechanism may be implemented by the elevation mechanism 360. The elevation mechanism 360 comprises a gear plate 362 for controlling the raising and lowering of the sensor platform 325. The elevation mechanism 360 comprises the motor 363, which controls the movement of a gear 368. The motor 363 is coupled to the control unit 150 via the wiring 160, to enable the control unit 150 to control the activity of the elevating mechanism 360. The motor 363 controls the motion of a driving gear 364, which moves the gear 368. The elevation mechanism 360 comprises a locking pin 367, which prevents the gear 368 from rotating when the motor 363 is not activated. As the gear 368 rotates, a driving screw 361 rotates to extend and retract (e.g., raise and lower) the sensor platform 325. The driving screw 361 is connected to the gear 368 via one or more gear bolts 370, representing any number of gear bolts 370, represented here by four gear bolts 370. In other exemplary embodiments of the subject matter, the sensor extraction mechanism comprises a curtaining mechanism (not shown). The curtaining mechanism comprises housing walls that may be openable or retractable or otherwise movable in order to expose the sensors thus enabling to perform a scan of a designated area or space. The gear plate 362 may be connected to the housing 310 via connection screws 369 and connection bolts 372

Figure 3E:
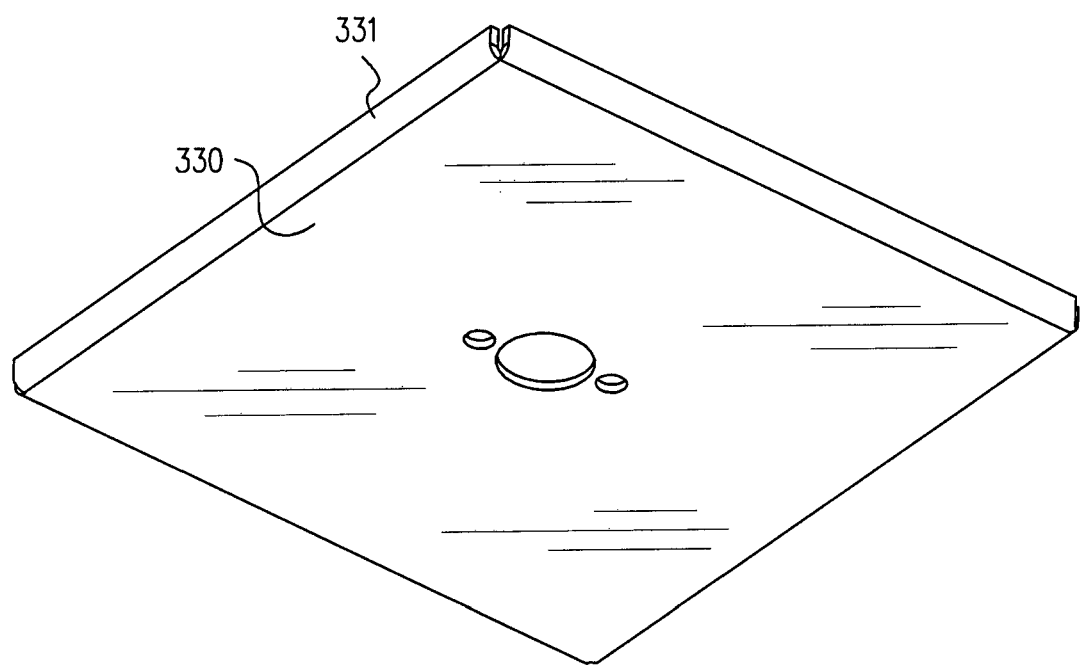

FIG. 3E schematically illustrated the cover plate 330, according to some exemplary embodiments of the subject matter. In some exemplary embodiments, the cover plate 330 is a wall of the housing 310, which, when aligned with the housing 310 tightly seals the housing 310 and prevents water, humidity, foreign objects or debris from damaging the components stored within, e.g. the one or more sensors 315. The cover plate 330 comprises a cover sealant lining 331, which seals the space between the cover plate 330 and the housing 310. For example, the cover sealant lining 331 may be or may include a rubber lining that a hermetically seals the detection unit 101 when the cover plate 330 is in a lowered state and the detection unit 101 is inactive. The cover plate 330 comprises rod openings 332, which enable connecting the cover plate 330 to the platform rods 335. The platform rods 335 are inserted into the rod openings 332 and attached via rod nut 336.

FIG. 4 schematically illustrates a control unit of a detection apparatus, according to some exemplary embodiments of the subject matter. The control unit 150 comprises a detection processor 410, which controls the actions of the object detection apparatus 100, for example, activation and deactivation of the sensors 315 and the motor 363. The detection processor 410 determines whether the sensors 315 detect a hazardous object according to scan data received by the detection processor 410 from the sensors 315.

According to the scan data, the detection processor 410 generates a notification that object detection apparatus 100 detected a hazardous object. The detection processor 410 controls the performance of the elevation mechanism 360, e.g. via control of the motor 363, to extend or retract (e.g., elevate and lower) the sensor platform 325 and the sensors 315. The detection processor 410 analyzes the scan data received from the sensors 315 to determine information related to the object detected by the sensors 315 to determine whether the object is a hazardous object. Based on the captured scan data, the detection processor 410 may determine the object is hazardous according to analysis of the scan data, for example, determining a size of the object, movement direction of the object, rate of movement of the object, or the like. The detection processor 410 may receive commands to program the sensor's activities, for example, the scanning radius of the sensors 315, Embodiments of the invention may include an article, such as a non-transitory computer or processor readable storage medium, e.g. a memory, a disk drive, or a USB flash memory encoding, including or storing instructions, e.g., computer-executable instructions, which when executed by a processor or controller, cause the processor or controller to carry out methods disclosed herein. The instructions may cause the detection processor 410 or controller to execute processes that carry out methods disclosed herein. The processes and displays presented herein are not inherently related to any particular computer or other apparatus. Various general purpose systems may be used with programs in accordance with the teachings herein, or it may prove useful to construct a dedicated device to perform the desired method. It will be appreciated that a variety of programming languages may be used to implement the embodiments of the invention as described herein.

The control unit 150 comprises a communication unit 420, which transmits the notification generated by the detection processor 410 to the user computerized device 260 and/or to the emergency server 265. In some cases, the communication unit 420 communicates with the vehicle processor 445 to receive the scan indication. The communication unit 420 may transmit to the vehicle processor 245 the notification when the object detection apparatus 100 detects a hazardous object. The communication unit 420 may be or may include, for example, a Bluetooth communication unit, a WIFI communication unit, a wireless communication unit, or a wired communication, etc.

The control unit 150 comprises a user interface 430 to enable manual configuration and customization of the object detection apparatus 100. For example, the user interface 430 may enable configuring predetermined time intervals at which the object detection apparatus 100 performs a scan. The user interface 430 may further be used to input contact information of the user computerized device 260 and/or the emergency server 265 address to enable the object detection apparatus 100 to transmit the notification to the user computerized device 260. In some non-limiting cases, the user interface 430 enables inputting a predetermined elevation or extension level to which the elevating mechanism 360 elevates or extends the sensors 315 for scanning the predetermined scanning area or scanning space.

FIG. 5 is a schematic flow chart of a method for detecting a hazardous object performed by an object detection apparatus, according to some exemplary embodiments of the subject matter.

Operation 500 discloses the object detection apparatus 100 receiving a scan indication to scan for hazardous objects. The scan indication may be received as a command from the user computerized device 260 via a user interface accessible by, or an application installed on, the user computerized device 260. The scan indication may be a command received by the object detection apparatus 100 from the vehicle processor 245 upon detection of a predetermined condition, e.g. upon detecting a key 247 is inserted into the vehicle ignition 248. If the key 505 is configured to start the vehicle 200 remotely, the vehicle processor 245 may be configured to transmit the scan indication to the object detection apparatus 100 upon or after the vehicle processor 245 detects receiving a signal to start the vehicle, e.g. a signal sent from a remotely activated key. In another non-limiting case, e.g. upon determining deactivation of a house alarm, office alarm, or the like, the alarm processor automatically transmits a "scan" indication to the object detection apparatus 100 to scan for the hazardous objects. In some cases, the scan indication is a predefined command to perform the scanning operation at predetermined times or time intervals.

Operation 505 discloses the object detection apparatus 100 extracting the sensors 315 to perform a scanning operation. Upon receiving the scan indication, the detection processor 410 activates the sensor extraction mechanism to expose the sensors 315 to the environment surrounding the object detection apparatus 100 to perform the scanning operation. For example, when the sensor extraction mechanism is the elevation mechanism, the motor 363 to elevate the sensor platform 325 to a predetermined elevation at which the scanning is performed by the sensors 315. Upon reaching the predetermined elevation, the detection processor 410 stops the motor 363.

In some exemplary embodiments of the subject matter, the extraction mechanism comprises a shutter mechanism connected to the housing 310 which open and close one or more shutters to expose the sensors 315 to enable scanning. When a scanning operation of the undercarriage occurs, the shutters remain open until completion of the scanning, at which time the shutters are closed to protect the sensors 315 from damage and tampering.

Operation 510 discloses the object detection apparatus 100 activating the sensors 315 to perform a scan of a predetermined scanning area or scanning space. The detection apparatus 410 activates the sensors 315 to scan for hazardous objects within a predetermined scanning area or scanning space. For example, the predetermined scanning area or scanning space for each sensor 315 is within a distance of a 1-meter radius in a 180 degree angle. The sensors may be positioned such that the scanning area or scanning space includes the whole space beneath the vehicle, or a broader area that also includes space on the road in the vicinity of the vehicle, e.g. adjacent to the vehicle.

Operation 515 discloses the object detection apparatus 100 receiving scan data from the sensors 315. The detection processor 410 receives from the sensors 315 scan data according to which the processor can determine whether a hazardous object was detected by the sensors 315. For example, when the sensor 315 detects a hazardous object within the predetermined scanning area or scanning space, the sensor 315 provides the detection processor 315 with scan data comprising a binary one. Conversely, when the sensor 315 does not detect a hazardous object within the predetermined scanning area or scanning space, the sensor 315 provides the detection processor 315 with scan data comprising a binary zero. In some other non-limiting embodiments, the scan data may include a determination whether an object was detected, what the size of the detected object is, the distance of the object from the sensor, the direction of motion of the detected object, the spatial coordinates of the detected object, the time of detection, the duration of the intrusion, and/or other detection data.

Operation 520 discloses the object detection apparatus 100 determining a hazardous object detected. The detection processor 410 analyzes the scan data to determine whether a hazardous object was detected within the predetermined scanning area or scanning space. For example, where the scan data received by the detection processor 410 comprises a binary one, the detection processor 410 determines that a hazardous object was detected by the sensor 315 according to analysis of the binary value of the scan data. In some exemplary cases, the scan data comprises a determination of that a hazardous object was detected according to distance data relating to the distance of the hazardous object from the object detection apparatus 100. In another exemplary embodiment, the scan data comprises a determination of that a hazardous object was detected according to size of an object scanned by the object detection apparatus 100.

In some embodiments, the processor may receive scan data including the size of a detected object, the spatial coordinated of the detected object within the predetermined scanning space, and/or the direction and speed of a detected moving object. The processor may compare the scan data to predetermined configurable data. For example, the processor may compare the size of the detected object to a threshold or range of sizes of objects that are to be detected. If the size of the detected object is within the predetermined range, the processor may determine that a hazardous object was detected. If the size of the detected object is not within the predetermined range, the processor may determine that a non-hazardous object was detected.

Operation 525 discloses the object detection apparatus 100 generating a notification that the sensors 315 detected a hazardous object. Upon determining that the sensor 315 detected a hazardous object, the detection processor 410 generates a notification to indicate that a hazardous object was detected within the predetermined scanning area or scanning space. In some cases, the notification may be or may include a message transmitted to the user computerized device 260, e.g. a text message, e-mail, a recorded video movie showing the scanned object obtained by the camera 206, instant message, or the like. In some cases, the notification may be or may include a command to activate an alarm system. For example, the notification causes activation of a vehicle alarm system, e.g. by activating sound or siren and/or lights of the vehicle, when a hazardous object is detected within the predetermined scanning area or scanning space, e.g. near the undercarriage of the vehicle 200. In another example, the notification or a message may be transmitted to a law enforcement entity to notify of the hazardous object detected. In some case, the notification comprises other indications obtained by the object detection apparatus 100, for example a size of the hazardous object detected, the distance of the hazardous object from the object detection apparatus 100, or the like.

Operation 530 discloses the object detection apparatus 100 receiving an end scan indication. The detection processor 410 receives the end scan indication, for example, an end command received from the user computerized device 260, or by receiving an indication of a second pressing of the ignition button 248 on the key 247.

Upon receiving the end scan indication, the object detection apparatus 100 activates operation 540 which includes the detection processor 410 lowering the sensors into the housing 310. The detection processor 410 activates the motor 363 to lower the sensor platform 325 or to retract it back to a secure position within the housing 310. Upon reaching a storing distance at which the sensors 315 are within the housing 310 and the cover plate 330 is aligned to seal the housing 310, thus providing a watertight and/or airtight compartment that stores the sensors 315.

Operation 550 discloses the object detection apparatus 100 deactivating the sensors 315. Upon insertion of sensors 315 into the housing 310, the detection processor 410 deactivates the sensors 315. In other embodiments, the deactivation of the sensors 315 may be performed before the sensors 315 are retracted into a secure position, e.g. before operation 540.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

As used herein the term "configuring" and/or 'adapting' for an objective, or a variation thereof, implies using materials and/or components in a manner designed for and/or implemented and/or operable or operative to achieve the objective.

Unless otherwise specified, the terms 'about' and/or 'close' with respect to a magnitude or a numerical value implies within an inclusive range of −10% to +10% of the respective magnitude or value.

Unless otherwise specified, the terms 'about' and/or 'close' with respect to a dimension or extent, such as length, implies within an inclusive range of −10% to +10% of the respective dimension or extent.

Unless otherwise specified, the terms 'about' or 'close' imply at or in a region of, or close to a location or a part of an object relative to other parts or regions of the object.

When a range of values is recited, it is merely for convenience or brevity and includes all the possible sub-ranges as well as individual numerical values within and about the boundary of that range. Any numeric value, unless otherwise specified, includes also practical close values enabling an embodiment or a method, and integral values do not exclude fractional values. A sub-range values and practical close values should be considered as specifically disclosed values.

As used herein, ellipsis ( . . . ) between two entities or values denotes an inclusive range of entities or values, respectively. For example, A . . . Z implies all the letters from A to Z, inclusively.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

Terms in the claims that follow should be interpreted, without limiting, as characterized or described in the specification.

The invention claimed is:

1. An object detection apparatus comprising:
a housing configured to be connected to an undercarriage of a vehicle, said housing comprising:
one or more sensors configured to simultaneously detect a combined predetermined scanning space of 360 degrees beneath the undercarriage of the vehicle to detect a hazardous object located within said combined predetermined scanning space;
a sensor extraction mechanism, which exposes the one or more sensors outside of the housing to a predetermined distance to enable scanning of said combined predetermined scanning space by the one or more sensors;
a detection processor connected to the one or more sensors and configured to:
receive commands from a user via a user computerized device to configure scanning parameters of the one or more sensors, said configurable scanning parameters comprise a radius of the combined predetermined scanning space, a shape of the combined predetermined scanning space, and planes in which the scanning occurs;
receive an indication that the vehicle is stationary;
automatically activate the sensor extraction mechanism to expose the one or more sensors for performing the scanning;
activate the one or more sensors to scan the combined predetermined scanning space;
receive scan data from the one or more sensors;
analyze the scan data to determine the hazardous object has been detected; and
generate and transmit a notification to the user computerized device that the hazardous object was detected within the combined predetermined scanning space.

2. The object detection apparatus of claim 1, wherein the object detection apparatus is connected to a vehicle processor and a vehicle power source of the vehicle.

3. The object detection apparatus of claim 1, further comprising a connection means to connect the object detection apparatus to a surface of the undercarriage of the vehicle.

4. The object detection apparatus of claim 1, further comprising a transceiver for transmitting the notification to the user computerized deice notify the user of the detection of the hazardous object.

5. The object detection apparatus of claim 1 wherein the detection processor is further configured to:
activate the sensor extraction mechanism to retract the one or more sensors upon receiving an end scan indication;
deactivate the one or more sensors.

6. The object detection apparatus of claim 1, wherein the notification is transmitted to the user computerized device as a text message, a video message, an image message, and a combination thereof.

7. The object detection apparatus of claim 1, wherein the notification further provides activating a light in a vehicle to notify that the hazardous object was detected.

8. The object detection apparatus of claim 1, wherein the sensor extraction mechanism comprises an elevation mechanism, which moves a sensor platform along the predetermined axis to enable the one or more sensors to detect the hazardous object located within the combined predetermined scanning space.

9. The object detection apparatus of claim 8, further comprising an external cover, to seal the housing when the object detection apparatus is not performing.

10. The object detection apparatus of claim 1, wherein the detection processor is further configured to activate a camera to provide an image or video of the hazardous object.

11. The object detection, apparatus of claim 1, wherein the detection processor is further configured to measure a duration of the hazardous object within the combined predetermined scanning space, and generate the notification.

12. An object detection apparatus, comprising:
a housing configured to be connected to an undercarriage of a vehicle, said housing comprising:
one or more sensors configured to simultaneously detect a combined predetermined scanning space of 360 degrees beneath the undercarriage of the vehicle to detect a hazardous object located within said combined predetermined scanning space;
a sensor platform supporting the one or more sensors;
an elevation mechanism, which moves the sensor platform along a predetermined axis outside of the housing to a predetermined distance to enable the one or more sensors to detect the hazardous object located within the combined predetermined scanning space;
a detection processor connected to the one or more sensors and configured to:
receive commands from a user via a user computerized device to configure scanning parameters of the one or more sensors, said configurable scanning parameters comprise a radius of the combined predetermined scanning space, a shape of the combined predetermined scanning space, and planes in which the scanning occurs;
receive an indication that the vehicle is stationary;
automatically activate the elevation mechanism to expose the one or more sensors to the predetermined distance for performing the scanning;
activate the one or more sensors to scan the combined predetermined scanning space;
receive scan data from the one or more sensors;
analyze the scan data to determine the hazardous object has been detected; and
generate and transmit a notification to the user computerized device that the hazardous object was detected within the combined predetermined scanning space,
an external cover, to seal the housing and enclose the one or more sensors when the one or more sensors are inactivate.

13. The object detection apparatus of claim 12, wherein the object detection apparatus is connected to a vehicle processor and a vehicle power source of the vehicle.

14. The object detection apparatus of claim 12, further comprising a connection means to connect the object detection apparatus to a surface of the undercarriage of the vehicle.

15. The object detection apparatus of claim 12, further comprising a transceiver for transmitting the notification to the user computerized device to notify the user of the detection of the hazardous object.

16. The object detection apparatus of claim 12, wherein the notification is transmitted to the user computerized device as a text message, a video message, an image message, and a combination thereof.

17. The object detection apparatus of claim 12, wherein the detection processor is further configured to:
activate the elevation mechanism to lower the sensor platform upon receiving an end scan indication;
deactivate the one or more sensors.

\* \* \* \* \*